(12) United States Patent
Poli

(10) Patent No.: US 9,766,592 B2
(45) Date of Patent: Sep. 19, 2017

(54) PRESSURE SENSOR

(71) Applicant: The Swatch Group Research and Development Ltd, Marin (CH)

(72) Inventor: Gian-Carlo Poli, Les Geneveys-sur-Coffrane (CH)

(73) Assignee: The Swatch Group Research and Development Ltd, Marin (CH)

( * ) Notice: Subject to any disclaimer, the term of this patent is extended or adjusted under 35 U.S.C. 154(b) by 472 days.

(21) Appl. No.: 14/483,417

(22) Filed: Sep. 11, 2014

(65) Prior Publication Data

US 2015/0101412 A1    Apr. 16, 2015

(30) Foreign Application Priority Data

Oct. 15, 2013    (EP) ..................................... 13188770

(51) Int. Cl.
| | |
|---|---|
| *G04B 47/06* | (2006.01) |
| *G01L 19/12* | (2006.01) |
| *G04G 21/02* | (2010.01) |
| *G01L 7/18* | (2006.01) |
| *G01L 9/00* | (2006.01) |

(52) U.S. Cl.
CPC .......... *G04B 47/066* (2013.01); *G01L 9/0092* (2013.01); *G01L 19/12* (2013.01); *G04G 21/02* (2013.01)

(58) Field of Classification Search
CPC .................................................. G04B 47/066
See application file for complete search history.

(56) References Cited

U.S. PATENT DOCUMENTS

| | | | | |
|---|---|---|---|---|
| 2,769,070 | A | | 10/1956 | Donald |
| 3,653,203 | A | * | 4/1972 | Hurt ....................... G04B 47/06 |
| | | | | 368/278 |

(Continued)

FOREIGN PATENT DOCUMENTS

| | | | | | |
|---|---|---|---|---|---|
| CH | | 555047 A | * | 3/1972 | ............. G04B 47/06 |
| CH | | 702296 A2 | * | 5/2011 | ............... G01C 5/06 |

(Continued)

OTHER PUBLICATIONS

European Search Report for Application No. EP 13 18 8770 dated Mar. 31, 2014.

*Primary Examiner* — R. A. Smith
*Assistant Examiner* — Herbert K Roberts
(74) *Attorney, Agent, or Firm* — Sughrue Mion, PLLC

(57) ABSTRACT

The invention concerns a pressure sensor including means of sensing pressure and converting pressure into an electrical signal able to be transmitted by an electrical circuit to an control interface circuit of an indicator device, wherein said sensing and conversion means include:
- a closed volume and a liquid contained in the closed volume, said liquid being electrically conductive and capable of moving inside said closed volume,
- at least one sensing member arranged inside the closed volume in a given position in said volume, said sensing member including at least one pair of electrodes and cooperating with the liquid when said liquid moves in the closed volume, so that said electrical circuit is closed when the liquid passes said sensing member.

The pressure sensor is intended to be integrated in a pressure measuring device, particularly a timepiece.

21 Claims, 4 Drawing Sheets

(56) References Cited

U.S. PATENT DOCUMENTS

| | | | | |
|---|---|---|---|---|
| 3,947,692 | A * | 3/1976 | Payne | G01F 23/241 |
| | | | | 177/204 |
| 3,992,949 | A * | 11/1976 | Edmondson | G04B 47/06 |
| | | | | 368/10 |
| 7,948,830 | B2 * | 5/2011 | Suzuki | B63C 11/02 |
| | | | | 368/11 |
| 2004/0108861 | A1 * | 6/2004 | Germiquet | G01F 23/265 |
| | | | | 324/663 |
| 2011/0113877 | A1 * | 5/2011 | Rebeaud | G01C 13/008 |
| | | | | 73/302 |
| 2012/0291558 | A1 * | 11/2012 | Parker | G01L 7/187 |
| | | | | 73/709 |

FOREIGN PATENT DOCUMENTS

| | | | |
|---|---|---|---|
| CH | WO 2014067768 A1 * | 5/2014 | G04B 39/00 |
| DE | 1 133 456 B | 7/1962 | |
| JP | 60-181678 A | 9/1985 | |

\* cited by examiner

PRESSURE SENSOR

This application claims priority from European Patent Application No. EP13188770.5 filed Oct. 15, 2013, the entire disclosure of which is hereby incorporated herein by reference.

FIELD OF THE INVENTION

The present invention concerns the technical field of pressure measuring devices and more particularly the invention concerns a pressure sensor including pressure sensing means using the progress of a liquid in a closed volume when said sensor is subjected to external pressure. It also concerns a barometric apparatus including a pressure sensor, in which the pressure information sensed by the sensor is transmitted and then for example displayed in the apparatus using an indicator device and/or used to control a predetermined action. The barometric apparatus may notably be included in a portable object of small dimensions, such as a wristwatch.

BACKGROUND OF THE INVENTION

There are already known wristwatches provided with a pressure measuring device. These wristwatches, for example diver's watches, conventionally include a pressure sensor, for example a membrane sensor whose deformations vary with pressure fluctuations encountered during dives. In a known embodiment, the variation in geometric dimensions of the pressure sensor with atmospheric pressure fluctuations is converted into the linear motion of a sensing arm, which controls the pivoting of a lever. The pivoting motion of the lever is in turn converted into the rotational motion of a gear train which meshes with a display wheel in a drive ratio calculated such that a pressure indicator hand carried by the display wheel provides the user of the watch with a legible pressure indication.

Constructions of the type briefly described above are typically used to provide the user of the watch with a pressure indication during a dive.

These mechanical pressure measuring and display devices are relatively complex and difficult to implement given the large number of mechanical parts comprised therein. Further, they require communication to be provided between the exterior of the watch case and the interior where the device is mounted which results in complex arrangements if the sealing of the watch is required to be guaranteed in all circumstances. These factors thus make it difficult to produce watches fitted with mechanical pressure measuring and display devices in an economical manner.

It is a main object of the invention to provide a pressure sensor that is simple and economical to implement.

It is also an object of the invention to provide a pressure sensor having a structure which allows it to be easily integrated in a portable object of small dimensions, and particularly in a watch, without affecting the sealing thereof.

SUMMARY OF THE INVENTION

To this end and according to a first aspect, the invention concerns a pressure sensor including means of sensing pressure and converting pressure into an electrical signal able to be transmitted by an electrical circuit to an indicator control interface, said sensor being characterized in that said sensing and conversion means include:

a closed volume and a liquid contained in the closed volume, said liquid being electrically conductive and capable of moving inside said closed volume, at least one sensing member arranged inside the closed volume in a given position in said volume, said sensing member including at least one pair of electrodes and cooperating with the liquid when the latter moves in the closed volume, so that said electrical circuit is closed when the liquid passes said sensing member.

According to a particular feature, the closed volume includes a first part forming the tank and a second part forming the capillary tube, the liquid being contained in the tank in the absence of pressure and moving from the tank towards and into the capillary tube under the effect of pressure.

According to a particular feature, the sensing member is arranged along the capillary tube. Thus, the sensing member senses the liquid which advances in the capillary tube when pressure is exerted on the tank.

Preferably, the pressure sensor further includes a first substrate and a second substrate which are superposed, a sealing frame joining the first and second substrates to define therebetween said closed volume.

According to a second aspect, the invention concerns a barometric apparatus including a pressure sensor according to the first aspect of the invention.

In addition to the pressure sensor of the invention, the apparatus includes:

at least one indicator device, an electrical circuit including a control interface circuit for the indicator device intended to transmit said pressure-related electrical signal to said indicator device, and at least one power source for said electrical circuit.

According to a third aspect, the invention concerns a timepiece including a pressure measuring apparatus according to the second aspect of the invention.

Preferably, the tank and the capillary tube of the pressure sensor extend in a substantially circular direction, which advantageously enables the sensor to be housed underneath the timepiece crystal or in the timepiece bezel.

According to a particular embodiment, the indicator device includes a display screen and/or an acoustic generator and/or a light generator associated with the pressure sensor and in particular with the electrical circuit thereof.

DESCRIPTION OF THE DRAWINGS

The invention will be better understood upon reading the following description of a particular embodiment, provided by way of non-limiting illustration, and illustrated by means of the annexed drawings, in which.

DETAILED DESCRIPTION OF PARTICULAR EMBODIMENTS

Figure 1:
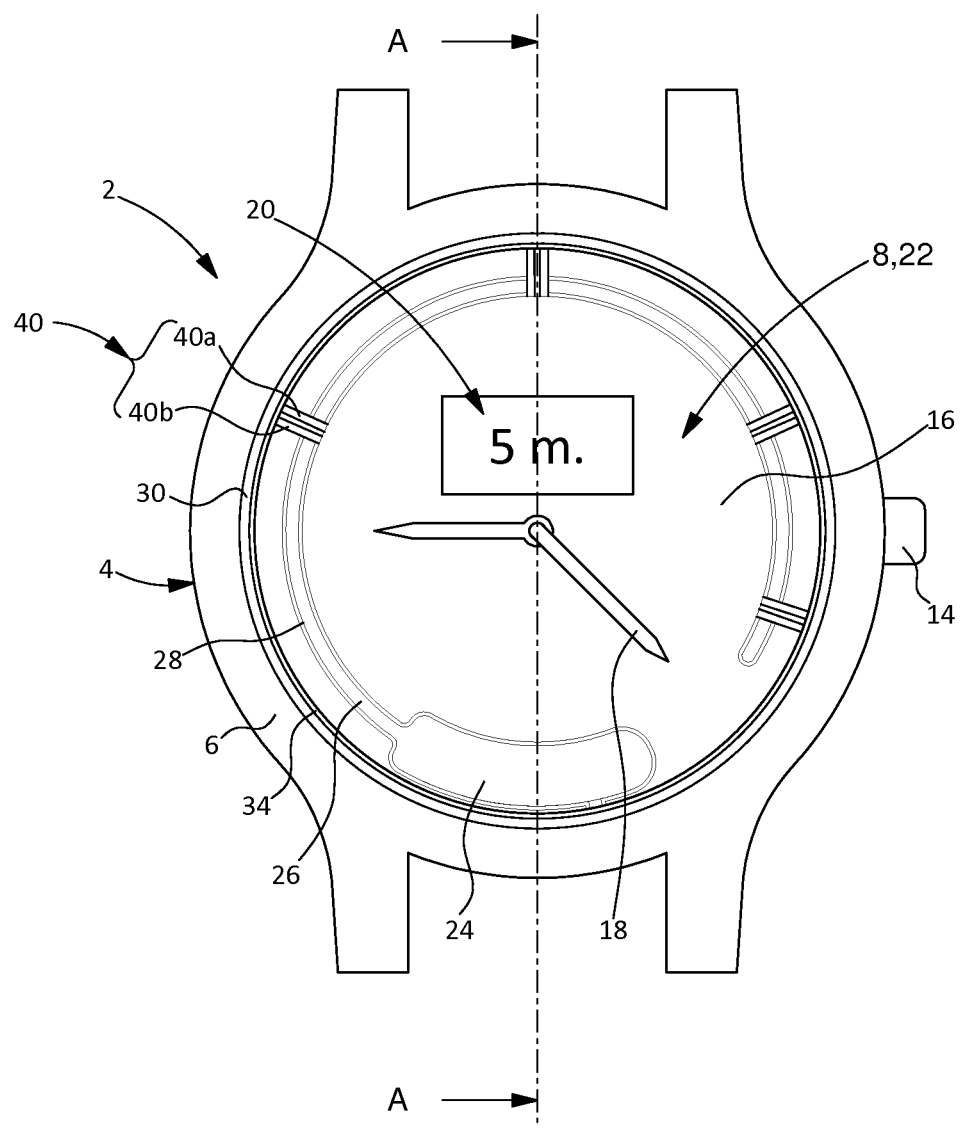
FIG. 1 shows a top view of a timepiece provided with a pressure sensor housed underneath the crystal, according to a first embodiment of the invention.
Figure 2:
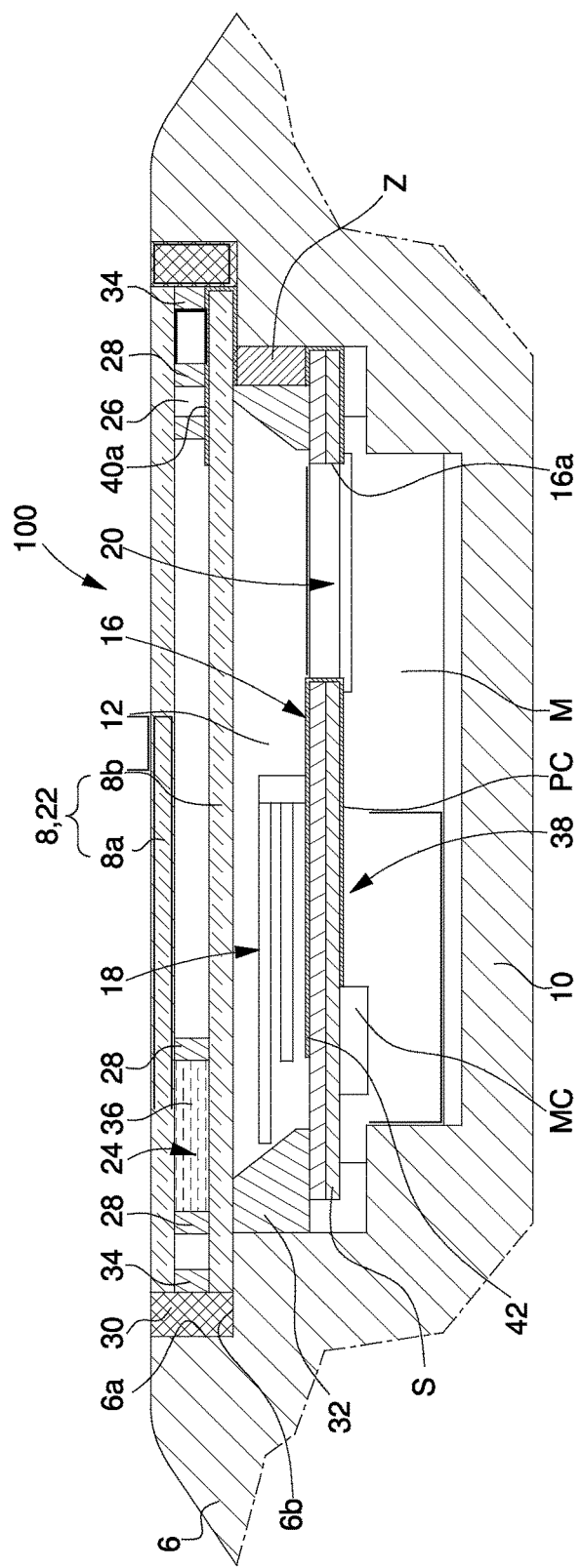
FIG. 2 is a transverse cross-section along line A-A of FIG. 1, illustrating a first variant embodiment.

Referring firstly to FIGS. 1 and 2, there is shown a pressure measuring apparatus 100, for example a depth gauge, which takes the form of a wristwatch type timepiece 2. Timepiece 2 includes, in the normal manner, a case 4, including a middle part 6, a crystal 8 and a back cover 10 delimiting a space 12 intended to receive a movement M (FIG. 2). The watch also includes a winding crown 14, a dial 16 and hands 18.

Timepiece 2, which, in this example, is also a pressure measuring apparatus 100, includes a depth indicator device 20, for example in the form of a liquid crystal display device, and a pressure sensor 22.

In the example of FIG. 1, pressure sensor 22 also plays the part of crystal 8, which takes the form here of an at least partially transparent glass or synthetic assembly which covers the entire dial 16 in a conventional manner.

Pressure sensor 22 includes a closed volume made in two successive parts. One of the two parts takes the form of a tank 24 while the other part takes the form of a capillary tube 26 closed at one end thereof and communicating at the other end with tank 24.

The closed volume formed by tank 24 and capillary tube 26 is delimited by an upper substrate 8a and a lower substrate 8b forming crystal 8. The upper and lower substrates 8a, 8b are joined in the manner of a liquid crystal cell by a sealing frame 28 with a closed contour, and whose shape defines the dimensions of tank 24 and of capillary tube 26.

Substrates 8a, 8b takes the form of a disc having a substantially identical diameter to that of an upper aperture 6a of middle part 6. A sealing gasket 30 is advantageously placed inside aperture 6a between middle part 6 and the sensor assembly so as to fix said assembly in a conventional sealed manner to the watch case, said assembly resting on a shoulder 6b arranged inside middle part 6. A flange 32 holds crystal 8 at a distance from dial 16.

Sensor 22 also includes an external sealing frame 34 arranged between the peripheral edges of substrates 8a, 8b.

Sealing frame 28 is used as a spacer between upper substrate 8a and lower substrate 8b. The substrates forming the sensor are made of an insulating material. In the illustrated example, in which the sensor is integrated in a timepiece above its display means and forms crystal 8, upper substrate 8a and lower substrate 8b are made of a transparent material, and arranged so that the conventional time display information of timepiece 2 can be read.

The thickness of substrates 8a and 8b is such that they can bend at least in the area thereof located above tank 24. Typically, the thickness of these substrates, at least in the tank area, is around 0.1 mm. Thus, with a tank which, in projection into the plane of the substrate, has a surface of 150 mm$^2$ and with a capillary tube which, in projection into the plane of the substrate, has a surface of 70 mm$^2$, a pressure range of 1 to 6 bars can be sensed, the section of the capillary tube typically being around 0.1 mm$^2$.

According to a preferred variant, upper substrate 8a has a smaller thickness than lower substrate 8b so that the upper substrate exposed to pressure can bend independently of lower substrate 8b. Improved response to pressure variation is thus obtained, yet the mechanical stability of the assembly remains compatible with the resistance and rigidity requirements of a timepiece crystal.

By way of example, a suitable transparent material may be glass, a plastic material or sapphire.

According to a variant in which the sensor is not integrated above a display means, for example when the sensor is integrated in a watch bezel, as is illustrated in FIGS. 3 to 7 which will be described in more detail below, upper substrate 8a and lower substrate 8b could be made of an opaque material, for example, plastic or opaque ceramic.

Figure 3:
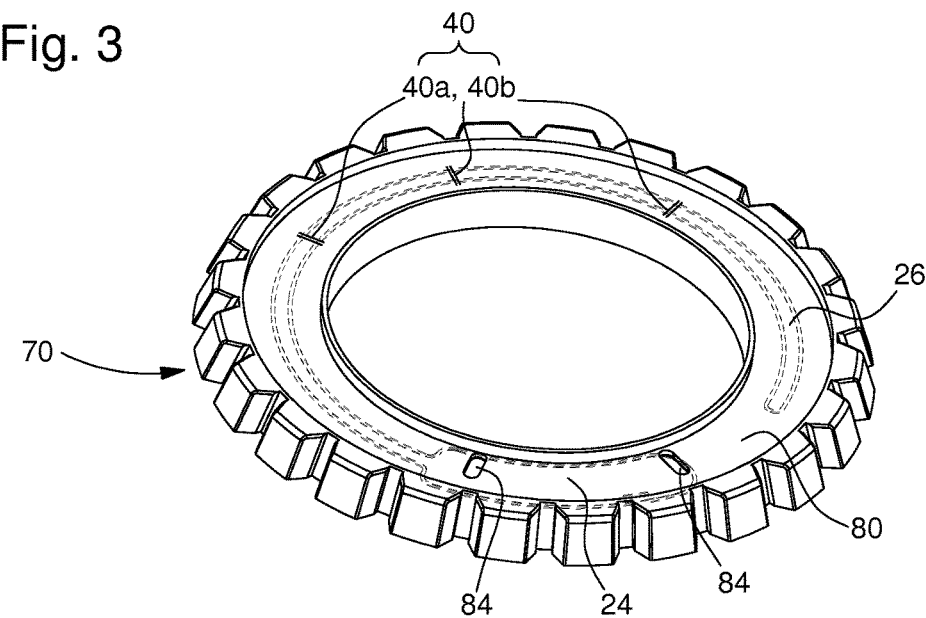
FIGS. 3 and 4 respectively show a perspective top view and a top view of a pressure sensor housed inside a timepiece bezel according to a second embodiment of the invention.
Figure 4:
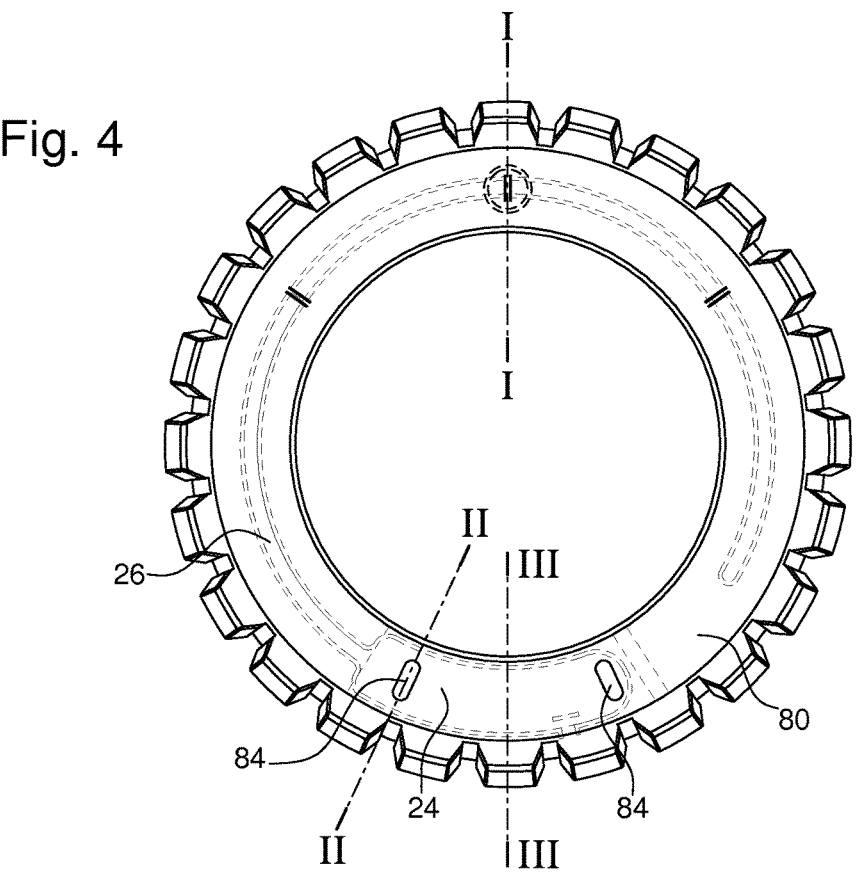

In the embodiment illustrated in FIGS. 3 and 4, tank 24 and capillary tube 26 are arranged in a substantially circular direction, so that the sensor 22 is inserted in timepiece 2. A configuration of the tank and capillary tube in a rectilinear direction or any other non-rectilinear and non-circular configuration may of course be envisaged.

Sensor 22 of the invention further includes an electrically conductive liquid 36. A liquid that is particularly suitable for its electrical conductive properties may be for example mineralised water, mercury or any other electrically conductive liquid. This liquid 36 is confined in the closed volume formed by tank 24 and capillary tube 26.

When pressure measuring apparatus 100 is at atmospheric pressure, liquid 36 is contained entirely inside tank 24 (FIG. 1). When pressure measuring apparatus 100 is subjected to pressure due to depth, the pressure is exerted on tank 24 over the entire surface in projection on the substrate thereof. Upper substrate 8a bends at least locally in the area thereof located close to tank 24. Liquid 36 is then driven out of tank 24 and moves into capillary tube 26.

The higher the pressure exerted, the greater the distance traveled by liquid 36 inside capillary tube 26. It is therefore possible to determine the value of the pressure exerted on pressure measuring apparatus 100 by measuring the distance traveled by liquid 36 inside capillary tube 26. To this end, pressure sensor 22 further includes sensing and conversion means for sensing the presence of liquid 36 in capillary tube 22 and converting it into information that is easy for the user to understand.

According to a feature of the invention, liquid 36 is electrically conductive. Liquid 36 cooperates with the sensing and conversion means which include an electrical circuit 38 and at least one sensing member 40 placed on said electrical circuit (FIG. 2). Advantageously, electrical circuit 38 with its various components (energy source, conductive paths PC, zebra connector Z, user interface microcontroller MC, display 20) is carried by a substrate S arranged underneath dial 16. According to a variant, electrical circuit 38 may be connected to the control circuit of timepiece movement M and share common components with the latter.

Sensing member 40 includes at least one pair of electrodes 40a, 40b. The pair(s) of electrodes are arranged on the surface of upper substrate 8a and/or lower substrate 8b which is in contact with liquid 36 along capillary tube 26. Typically, the electrodes are made of a material such as indium tin oxide (ITO) which has the advantage of being electrically conductive and optically transparent. Other possibilities exist for making these electrodes, for example nano-wire conductors (AG nano-wires) or other conductive materials in layers that are thin enough to be invisible.

Under the effect of the pressure exerted on the sensor surface, liquid 36 is driven out of tank 24 and advances in capillary tube 26. When liquid 36 comes into contact with a sensing member 40, it establishes an electrical contact between electrodes 40a 40b of the electrode pair as a result of its electrical conductivity, and therefore closes the electrical sensing circuit 38. An electrical signal is then transmitted to an interface control circuit of an indicator device 20 which indicates to the user that a first pressure threshold has been crossed. When liquid 36 comes into contact with sensing member 40 along capillary tube 26, an electrical contact is closed again and a second electrical signal is then transmitted to the interface control circuit of an indicator device which indicates to the user that a second pressure threshold has been crossed and so on.

The electrodes of the electrode pair 40a, 40b are either arranged juxtaposed on upper substrate 8a or lower substrate 8b (FIG. 1) or arranged facing each other between upper substrate 8a and lower substrate 8b (not shown).

Thus, by arranging sensing members 40 at suitable distances from each other along capillary tube 26, it is possible not only to sense the pressure exerted on tank 24, but also to quantify and/or determine the crossing of successive pressure thresholds. Typically, the sensing members are separated from each other by a distance allowing stage-related information to be provided for divers.

The pressure-related information is thus converted into an electrical signal which is transmitted by means of a conductive path to the control interface circuit of an indicator device, for example a display device 20.

FIG. 2 shows a variant embodiment in which the indicator device is a display device 20 arranged underneath dial 16 and visible through an aperture 16a arranged in dial 16.

Display device 20 not only provides an indication of the fact that pressure is being exerted, but can also provide a numerical value representative of the pressure, this numerical value being capable of changing gradually as liquid 26 travels through capillary tube 26 and cooperates with successive sensing members 40.

Preferably, depth display device 20 takes the known form of a digital display device including a liquid crystal cell displaying alphanumerical characters, which can also be easily read underwater. Backlighting can of course be switched on to facilitate reading of the display in low lighting conditions. In the example illustrated in FIG. 1, the information displayed is a depth of 5 meters, due to the pressure exerted on the pressure measuring apparatus and measured by pressure sensor 30.

By way of variant, the visual indicator device 20 just described may be replaced or associated with another type of indicator such as an acoustic generator, a vibrator device and/or a light generator. For example, in the case of a diver's watch including a device for lighting the dial, the lighting device could be switched on automatically as soon as the sensor of the invention senses that a pressure threshold representative of a determined depth has been crossed.

In a known and advantageous manner, electrical circuit 38 may be powered by at least one solar cell 42 arranged in a suitable manner on dial 16 for optimum light reception. This solar cell can provide energy which will be stored in an energy storage element (accumulator, super capacitor, etc. . . . ) in order then to be able to power the electrical circuit even if there is no longer any light on solar cell 42.

FIGS. 3 to 7 illustrate another embodiment of the invention, in which a pressure sensor 22 is not formed by the timepiece crystal, but integrated in a timepiece bezel 70. In a known manner, bezel 70 takes the form of a notched ring arranged on the middle part of the timepiece and capable of rotating with respect thereto.

Bezel 70 includes an annular housing 72 extending transversely from its upper surface and housing a pressure sensor 22 similar to that described with reference to FIGS. 1 and 2. Pressure sensor 22 includes a tank 24 and a capillary tube 26, which extend in a substantially circular direction and are contained in a closed space delimited by an upper substrate 74, and a lower substrate 76, which are joined by a sealing frame 78. Circular inner and outer sealing frames 78a, 78b are provided over the entire perimeter of sensor 22 to reinforce the sensor mechanically.

Figure 6:
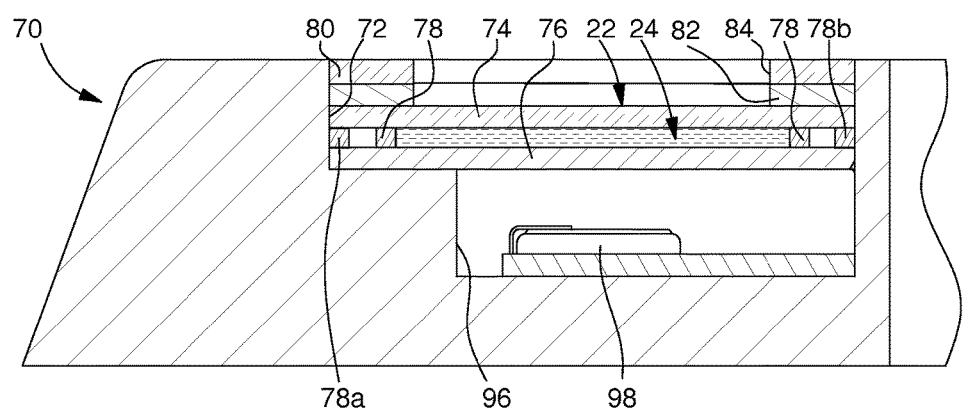
Figure 7:
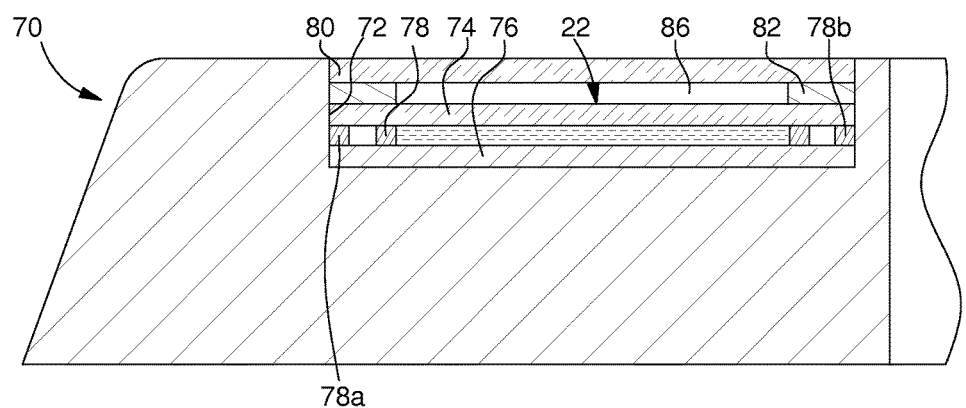

Upper substrate 74 is surmounted by a protective layer 80 and by a masking layer 82. The masking layer is interrupted in the area above tank 24 (FIGS. 6 and 7). Protective layer 80 includes two holes 84 also arranged above tank 24 so as to allow a pressure, for example via a liquid, to be exerted directly on the part of upper substrate 74 of the sensor arranged facing tank 24, and thus to act on substrate 74 at this location.

An empty space 86 is thus arranged between upper substrate 74 and protective layer 80 in the tank area as seen in FIG. 7. Space 86 and apertures 84 allow external pressure to be exerted over the entire surface of tank 32 and liquid 36 to be driven into capillary tube 34, in a similar manner to that described for the preceding embodiment (FIGS. 1 and 2).

Figure 5:
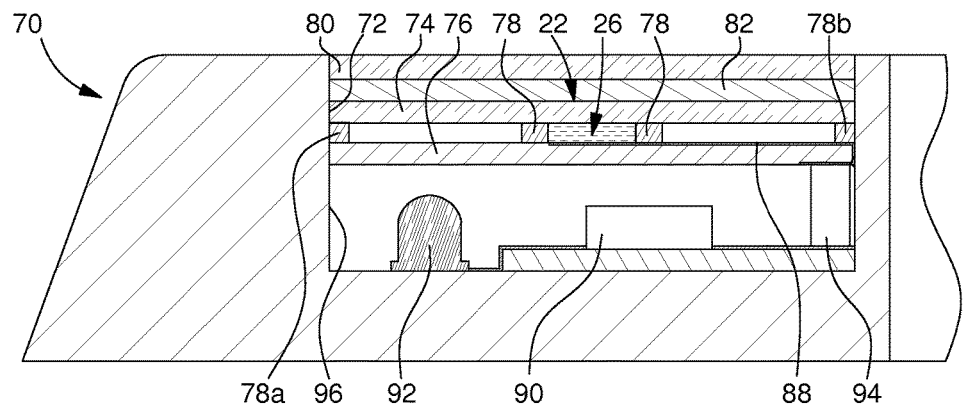
FIGS. 5 to 7 are partial transverse cross-sections, taken respectively along lines I-I, II-II and III-III of FIG. 4, showing the arrangement of the pressure sensor inside the bezel.

This arrangement is particularly illustrated in FIG. 5, which is a transverse cross-section of bezel 70 showing capillary tube 26 (line I-I of FIG. 4), in FIG. 6, which is a transverse cross-section of bezel 70 showing one of holes 84 (line II-II of FIG. 4), and in FIG. 7, which is a transverse cross-section of bezel 70 showing tank 24 (line III-III of FIG. 4).

As is more particularly shown in FIGS. 3 and 5, sensing members 40, in this case the ITO electrode pair 40a, 40b, are arranged on lower substrate 76 at suitable places in the area of capillary tube 26, and in contact with conductive liquid 36 contained in the volume defined by the upper and lower substrates and sealing frame 78. Electrodes 40a, 40b are connected to a conductive path 88 partially arranged on lower substrate 76 (FIGS. 5 and 6) and leading to a control interface circuit 90 of an indicator device 92 via a zebra connector 94 disposed in a recess 96 arranged underneath sensor 22 In the illustrated example, the indicator device is an LED visible through substrates 74, 76 and protective layer 80. Circuit 90 is powered by a battery 98 (FIG. 6).

As described with reference to the embodiment of FIG. 1, when conductive liquid 36 advances in capillary tube 26 as far as one of sensing members 40, the electrical circuit is closed between sensing member 40 and conductive path 88. This path extends underneath lower substrate 76 where it communicates with a printed circuit board which can transmit information to a receiver device (not shown) arranged in the timepiece. Said receiver device may be a pressure value display device, as in the example of the first embodiment, or a device for automatically detecting pressure threshold crossing.

In the example illustrated in FIG. 3, electrodes 40a, 40b of sensing members 40 are arranged side-by-side making it possible to treat only one of substrates 74, 76 during manufacture.

The invention is not limited to the particular embodiment which has just been described. In particular, when the pressure measuring apparatus is not a timepiece, the pressure sensor may extend in a non-circular direction, for example a substantially linear direction. Electrical power may be supplied from a source other than a battery or solar cell. The display device may be different from a liquid crystal screen.

In particular, the electrical circuit of the pressure measuring device could be separate from the electrical circuit of the timepiece.

In particular, the sensing members could be distributed differently on one substrate or the other. In a similar manner, the electrical path could be arranged on the upper substrate and not on the lower substrate.

What is claimed is:

1. A timepiece comprising:
a pressure measuring apparatus, the pressure measuring apparatus comprising:
a pressure sensor configured to sense pressure exerted on an exterior surface of the timepiece and convert the sensed pressure into an electrical signal to be transmitted to a control interface circuit, wherein said pressure sensor comprises:
a closed volume formed on an interior of the exterior surface of the timepiece;
an electrically conductive liquid contained in the closed volume; and,
a sensing member arranged inside the closed volume, said sensing member comprising at least one pair of electrodes configured to close an electrical circuit when said liquid connects the pair of electrodes in the closed volume.

2. The timepiece according to claim 1, wherein the closed volume includes a first part forming a tank and a second part forming a capillary tube, the electrically conductive liquid being contained in the tank in the absence of pressure greater than atmospheric pressure and moving from the tank into the capillary tube under the effect of the pressure greater than atmospheric pressure.

3. The timepiece according to claim 2, wherein said sensing member is arranged along the capillary tube.

4. The timepiece according to claim 2, wherein the tank and the capillary tube are arranged in series in a substantially circular direction around an edge of the timepiece.

5. The timepiece according to claim 2, wherein the sensing member comprises a plurality of sensing members arranged in series along the capillary tube.

6. The timepiece according to claim 1, wherein the at least one pair of electrodes is arranged in a same plane.

7. The timepiece according to claim 1, wherein the exterior surface of the timepiece comprises a face of the timepiece, the face comprising a first substrate and a second substrate which are superposed, a sealing frame joining the first and second substrates to define therebetween said closed volume.

8. The timepiece according to claim 7, wherein the sensing member is supported by the first substrate or the second substrate.

9. The timepiece according to claim 8, wherein the sensing member is supported by only one of the first substrate or the second substrate.

10. The timepiece according to claim 1, wherein said pressure sensor further comprises an electrical path that cooperates with said sensing member and said electrically conductive liquid.

11. The timepiece according to claim 7, wherein the first substrate is an upper substrate of the face of the timepiece and the second substrate is a lower substrate of the face of the timepiece, the upper substrate having a thickness smaller than a thickness of the lower substrate.

12. The timepiece according to claim 1, wherein the timepiece further comprises:
the electrical circuit including a control interface circuit for an indicator device intended to receive said pressure-related electrical signal and to re-transmit said signal to said indicator device, and
at least one power source for said electrical circuit.

13. The timepiece according to claim 7, wherein said pressure sensor is integrated in the face of the timepiece.

14. The timepiece according to claim 13, wherein one of the first substrate and the second substrate forms an exterior of the exterior surface of the timepiece.

15. The timepiece according to claim 1, further comprising:
a bezel that forms the exterior surface of the timepiece, the bezel housing said pressure sensor.

16. The timepiece according to claim 1, further comprising a display screen and/or a vibrator device and/or an acoustic generator and/or a light generator.

17. The timepiece according to claim 13, wherein the sensing member is substantially transparent.

18. The timepiece according to claim 16, wherein the display screen is disposed beneath the face of the timepiece.

19. The timepiece according to claim 15, wherein the bezel is a notched ring extending in a substantially circular direction around a periphery of the timepiece.

20. The timepiece according to claim 15, wherein the bezel comprises:
an upper substrate;
a lower substrate opposing the upper substrate; and
a sealing frame joining the upper substrate and the lower substrate,
wherein the pressure sensor is enclosed between the upper substrate and the lower substrate.

21. The timepiece according to claim 15, further comprising:
a battery disposed in the bezel, wherein the battery powers the display to display a pressure corresponding to the electrical signal.

* * * * *